United States Patent
Baliga

(10) Patent No.: US 9,091,613 B2
(45) Date of Patent: Jul. 28, 2015

(54) MULTI-SPECTRAL ULTRASONIC GAS LEAK DETECTOR

(71) Applicant: General Monitors, Inc., Lake Forest, CA (US)

(72) Inventor: Shankar B. Baliga, Irvine, CA (US)

(73) Assignee: General Monitors, Inc., Lake Forest, CA (US)

( * ) Notice: Subject to any disclaimer, the term of this patent is extended or adjusted under 35 U.S.C. 154(b) by 330 days.

(21) Appl. No.: 13/802,410

(22) Filed: Mar. 13, 2013

(65) Prior Publication Data

US 2014/0005958 A1    Jan. 2, 2014

Related U.S. Application Data

(63) Continuation-in-part of application No. 13/535,182, filed on Jun. 27, 2012, now Pat. No. 8,955,383.

(51) Int. Cl.
G01M 3/24 (2006.01)
G06N 3/02 (2006.01)

(52) U.S. Cl.
CPC .............. *G01M 3/24* (2013.01); *G01M 3/243* (2013.01); *G06N 3/02* (2013.01)

(58) Field of Classification Search
CPC ................................ G01M 3/24; G01M 3/243
See application file for complete search history.

(56) References Cited

U.S. PATENT DOCUMENTS 5,521,840 A * 5/1996 Bednar ......................... 702/183
5,533,383 A    7/1996 Greene et al.
6,058,076 A * 5/2000 Komninos ..................... 367/135
2006/0017578 A1    1/2006 Shubinsky et al.
2011/0018996 A1* 1/2011 Mian et al. .................... 348/143

FOREIGN PATENT DOCUMENTS

GB        2367362        4/2002

OTHER PUBLICATIONS

PCT/US2013/047202, International Search Report and Written Opinion of the International Searching Authority, mailed Nov. 5, 2013.

* cited by examiner

*Primary Examiner* — Paul West
(74) *Attorney, Agent, or Firm* — Larry K. Roberts

(57) ABSTRACT

An ultrasonic gas leak detector is configured to discriminate the ultrasound generated by a pressurized gas leak into the atmosphere from false alarm ultrasound. An exemplary embodiment includes multiple acoustic sensors for detecting acoustic energy and providing sensor signals, including a broadband sensor and at least one narrowband sensor, and an electronic controller responsive to the sensor signals. In one exemplary embodiment, the electronic controller is configured to provide a threshold comparator function to compare a sensor signal value representative of sensed ultrasonic energy to a gas detection threshold value, and an Artificial Neural Network (ANN) function for processing signals derived from the multitude of sensor signals and applying ANN coefficients configured to discriminate false alarm sources from gas leaks. An output function generates detector outputs in dependence on the threshold comparator output and the ANN output.

20 Claims, 8 Drawing Sheets

MULTI-SPECTRAL ULTRASONIC GAS LEAK DETECTOR

CROSS-REFERENCE TO RELATED PATENT APPLICATION

This application is a continuation-in-part of U.S. patent application Ser. No. 13/535,182, filed Jun. 27, 2012, the entire contents of which are incorporated herein by reference.

BACKGROUND

Ultrasonic gas leak detectors measure the sound pressure waves generated by the turbulent flow when gas escapes from higher pressures to the ambient atmosphere. Such gas leak detectors are used as industrial safety devices to monitor the unwanted or unexpected release of combustible or toxic gases into the atmosphere. The leaks need to be identified quickly before they grow further in magnitude, to allow for timely remedial action to be taken.

Conventional ultrasonic gas leak detectors are threshold devices that cannot discriminate between the ultrasound created by other manmade or natural sources, such as machinery, electrical discharge, acoustic speakers or biological sources, from those produced by real gas leaks. A way to mitigate false alarms, avert nuisance trips, and avoid costly unwarranted process shutdowns with such ultrasonic gas leak detectors is to raise the alarm threshold level several decibels above the background ultrasonic level. Raising the alarm level has the drawback of reducing detection distance to the gas leak, thereby the total area of coverage, or of ignoring gas leaks until they build up in severity, often with catastrophic consequences. Another precaution against false alarms is via the use of lengthy time delays which result in undesirable delays to the remedial action in case of a dangerous gas leak, negating the benefit of the fast response time inherent with ultrasonic gas leak detectors.

BRIEF DESCRIPTION OF THE DRAWINGS

Features and advantages of the disclosure will readily be appreciated by persons skilled in the art from the following detailed description when read in conjunction with the drawing wherein.

DETAILED DESCRIPTION

Figure 1:
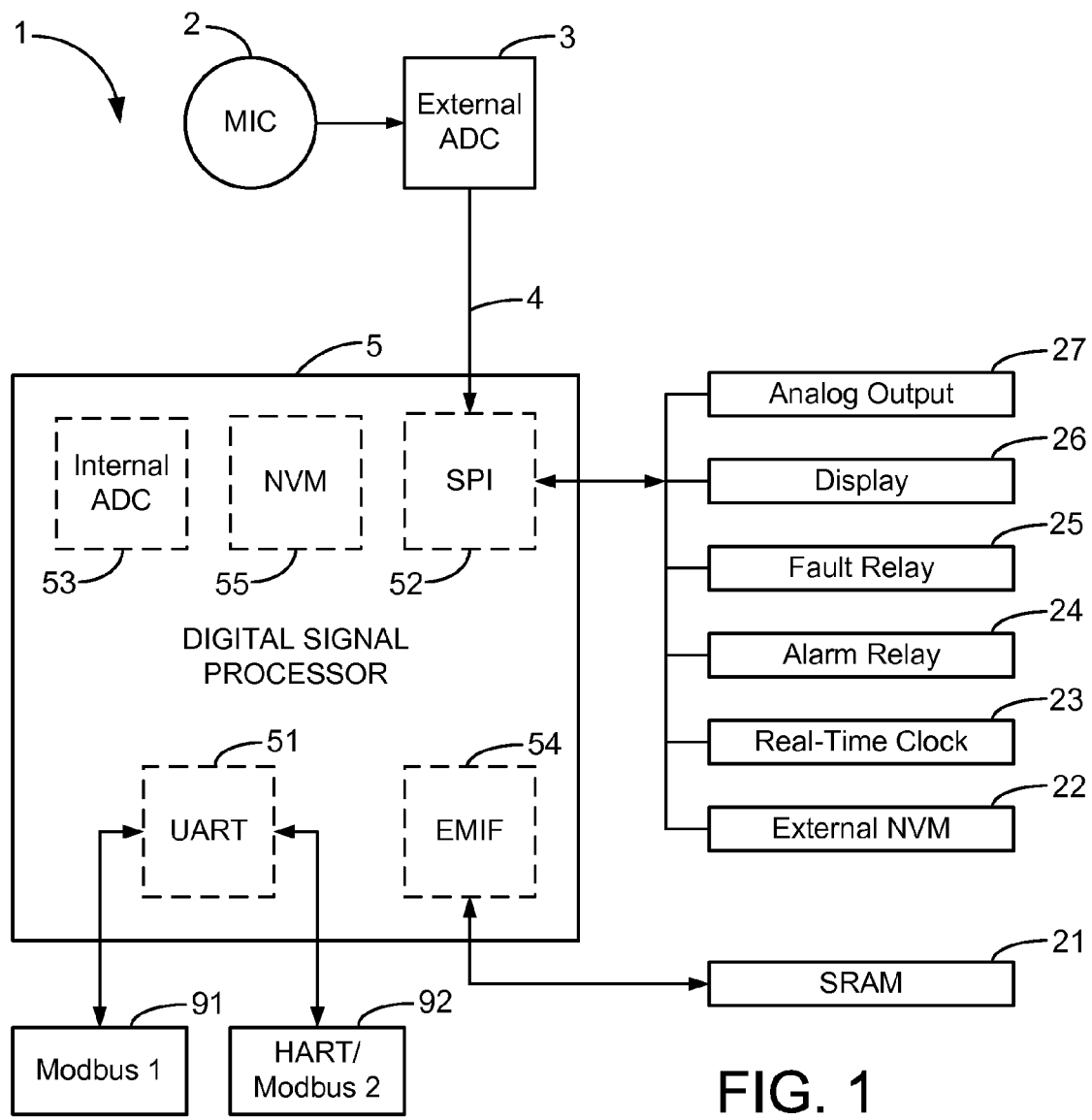
FIG. 1 is a schematic block diagram of an exemplary embodiment of an ultrasonic gas leak detection system utilizing a single acoustic sensor.

In the following detailed description and in the several figures of the drawing, like elements are identified with like reference numerals. The figures are not to scale, and relative feature sizes may be exaggerated for illustrative purposes.

FIG. 1 illustrates a schematic block diagram of an exemplary single sensor ultrasonic gas leak detection system 1 comprising an acoustic microphone or piezoelectric sensor 2 as an acoustic sensing element. In an exemplary embodiment, the microphone 2 may be a pre-polarized pressure microphone, with pre-amplification and signal conditioning circuitry, which can be operated in the audible range and well beyond the audible range out to ultrasonic frequencies of 100 kHz. Such a microphone is manufactured by G.R.A.S. Sound and Vibration of Holte, Denmark, Microtech Gefell GmbH of Gefell, Germany, or Bruel Kjaer of Naerum, Denmark. The ultrasonic region is defined as a frequency range beyond human hearing, starting at approximately 20 kHz in healthy, young human adults. Higher ultrasonic frequencies are attenuated more rapidly in air than lower frequencies, and the practical applications for an ultrasonic gas leak detection system are typically for frequencies less than 100 kHz.

In another exemplary embodiment, the ultrasonic microphone 2 may be a fiber optical microphone (FOM) that can be operated in the audible frequency range as well as beyond into the ultrasonic frequency range. An exemplary FOM suitable for the purpose is manufactured by Sennheiser Electronic GmbH of Wedemark, Germany. Another manufacturer of fiber optic microphones is Optoacoustics of Moshav Mazor, Israel.

In yet another exemplary embodiment, the ultrasonic microphone 2 may be a miniature microphone based on MEMS (Micro Electro Mechanical Systems) technology that can be operated well beyond the audible range of 15 kHz and into the ultrasonic frequency range out to 100 kHz. Such a MEMS microphone may be mounted on a printed circuit board (PCB) along with pre-amplification and signal conditioning circuitry, and housed in an environmentally robust mechanical enclosure that permits passage of ultrasonic sound energy to the sensing element. An exemplary MEMS microphone that may be used in such fashion is the SiSonic™ Surface Mount Microphone manufactured by Knowles Acoustics of Itasca, Ill. In an exemplary embodiment suitable for operation in a hazardous location, the MEMS microphone may be housed behind a flame arrestor. Such a flame arrestor prevents the transmission of ignited flames from within the microphone housing structure to the external environment while permitting acoustic energy to flow from the external environment to the microphone. Such a method of protection is known as explosion proof or flame proof. Some of the standards that are widely accepted by the industry and government regulatory bodies for explosion proof or flame proof designs are CSA C22.2 No. 30-M1986 from the Canadian Standards Association, FM 3600 and 3615 from Factory Mutual, and IEC 60079-0 and IEC 60079-1 from the International Electrotechnical Commission. Other protection methods may be applied for other environmental protection requirements such as ingress protection against sold objects, liquids, and mechanical impact as described in IEC 60529 from the International Electrotechnical Commission.

The acoustic microphone sensors described above provide for wide frequency response from the audible region into the ultrasonic region out to 100 kHz frequencies, e.g. 20 kHz to 100 kHz. Other type of acoustic sensors are available that can provide for more sharply peaked, narrowband acoustic response centered on mechanical resonance frequencies. Acoustic sensors that depend on the phenomenon of piezoelectricity lend themselves naturally to such resonant behavior in converting mechanical sound energy into electrical energy. Examples of manufacturers of such piezoelectric acoustic sensors are Audiowell Electronics Co., Ltd. of Guangzhou, China, Murata Manufacturing Company, of Kyoto, Japan, and Parsonics Corporation of Woodstock, Ill. Piezoelectric miniature micromachined transducers (pMUTs) fabricated using MEMS technology may also be used as sensing elements for the acoustic sensor 2.

Regardless of the acoustic sensor type and protection concept utilized, the analog signal generated by the microphone or piezoelectric sensor 2 is converted into a digital signal by an external analog to digital converter (ADC) 3. In an exemplary embodiment, the ADC 3 provides a signal 4 with 12-bit signed integer resolution and a sampling rate of 200 kHz.

Figure 2:
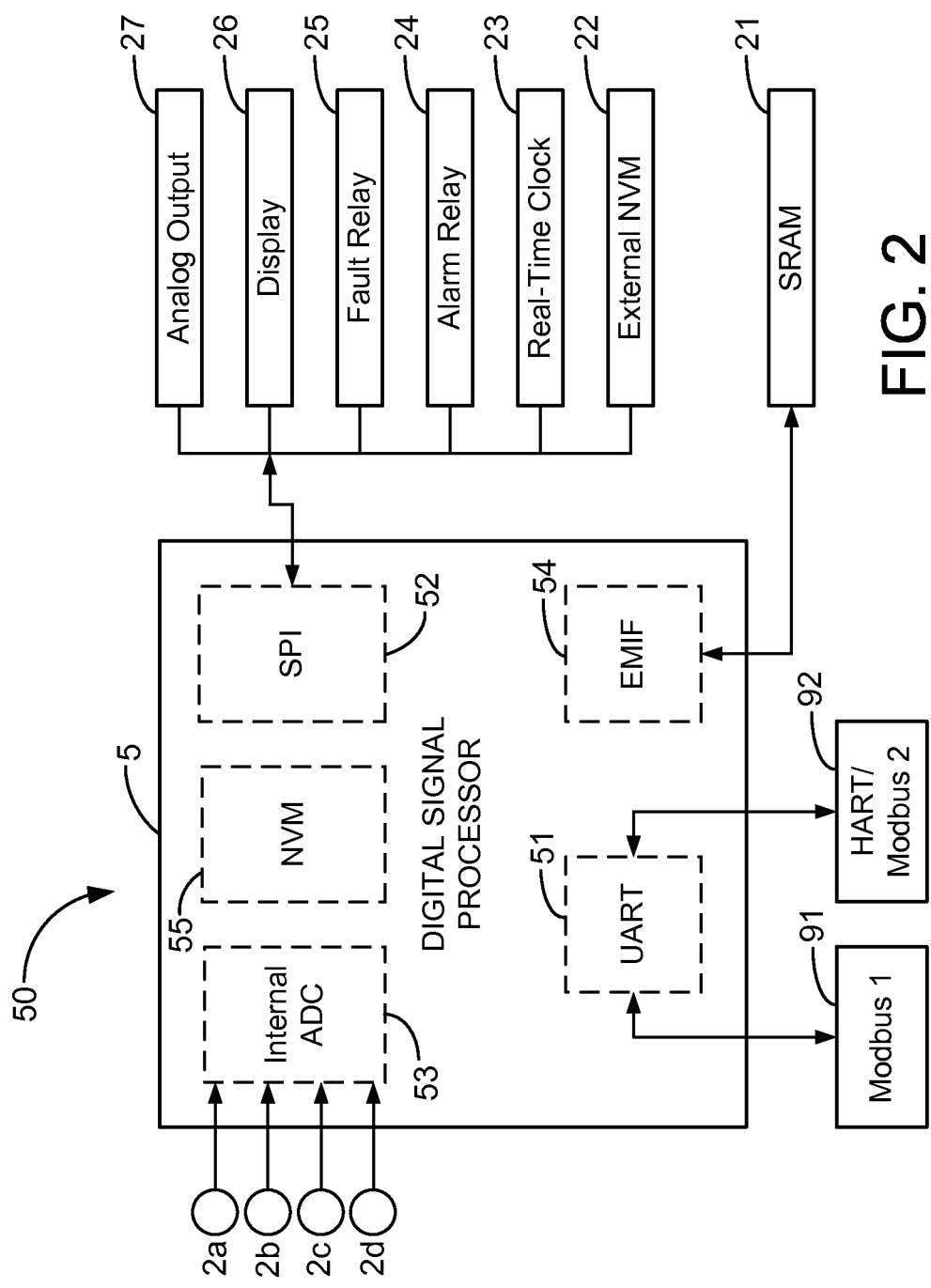
FIG. 2 is a schematic block diagram of an exemplary embodiment of an ultrasonic gas leak detection system utilizing multiple acoustic sensors with narrowband frequency responses.

FIG. 2 illustrates a schematic block diagram of an exemplary embodiment of a multiple sensor ultrasonic gas leak detection system 50 comprising four acoustic microphones or piezoelectric sensors 2a, 2b, 2c, 2d as acoustic sensing elements. In an exemplary embodiment, the analog signals generated by the sensors are converted into a digital signal by the internal analog to digital converter (ADC) 53. For many applications, the internal analog to digital converter 53 is better suited than the external analog to digital converter 3 of FIG. 1 for the high sampling rate (200 kHz) data acquisition from multiple acoustic sensors. In an exemplary embodiment, the four acoustic sensors have a peaked, narrowband, response at four different acoustic frequencies such as 10 kHz, 25 kHz, 40 kHz and 55 kHz spanning the audible through ultrasonic frequency range presently used in ultrasonic gas leak detectors. The selected frequencies will typically primary be in the ultrasonic range, but an audible frequency or frequencies may typically be included to measure audible nuisances. An exemplary bandwidth of the sensors 2a, 2b, 2c and 2d is on the order of 3 kHz. Other bandwidths may also be suitable. In an exemplary embodiment, the four acoustic sensors are piezoelectric sensors with non-overlapping peaked frequency response, enabling multi-spectral acoustic detection. Other frequencies may be selected for the peaked response of the acoustic sensors, including those that correspond to the frequencies generated by nuisance ultrasonic sources such as machinery; measurements taken at such select frequencies may further aid in the discrimination of ultrasound generated by gas leaks from that generated by background noise.

Figure 3:
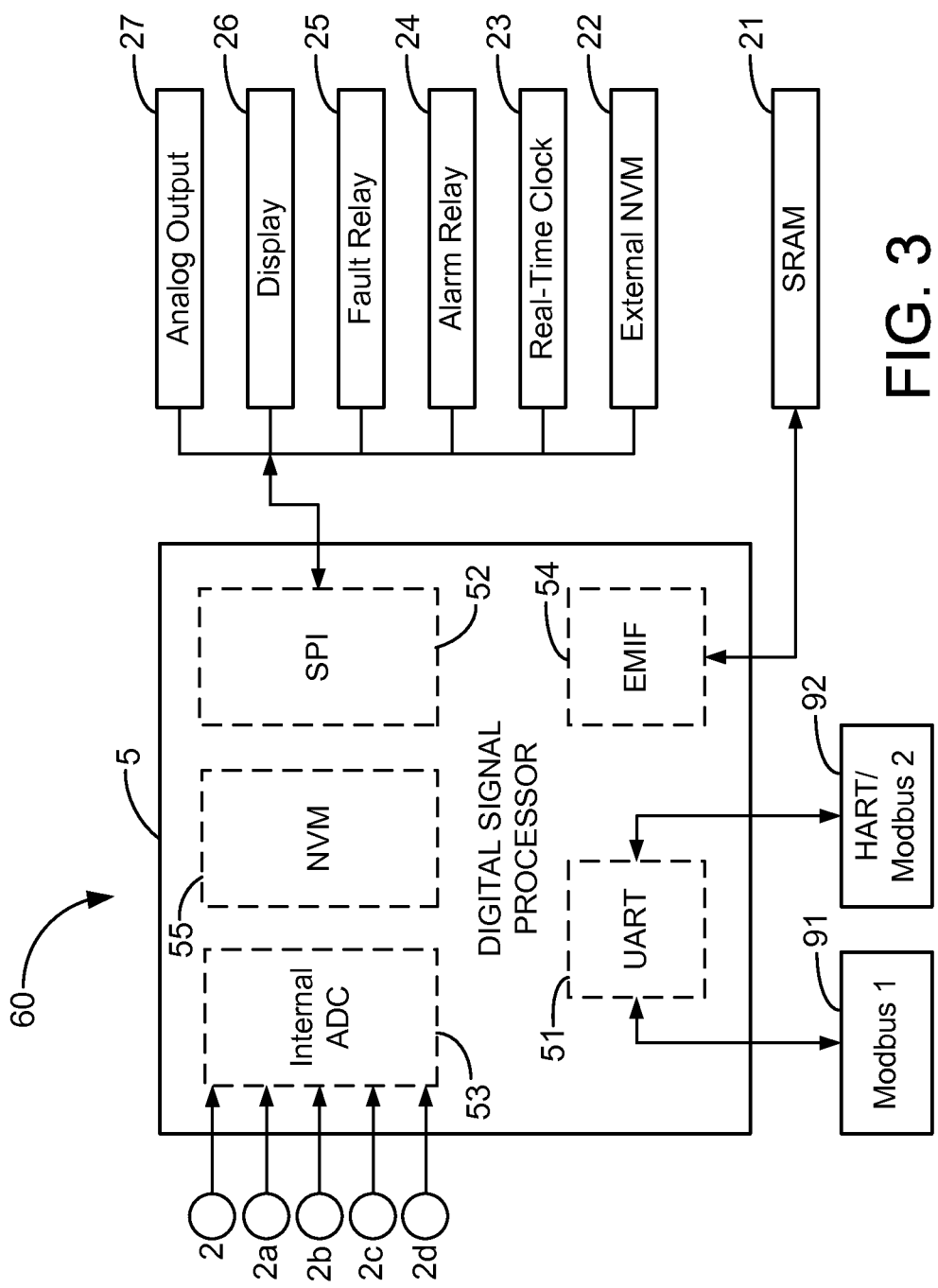
FIG. 3 is a schematic block diagram of an exemplary embodiment of an ultrasonic gas leak detection system utilizing multiple acoustic sensors with narrowband frequency responses and an acoustic sensor with broad frequency response.

FIG. 3 is a schematic block diagram of an exemplary embodiment of an ultrasonic gas leak detection system 60 comprising multiple, multi-spectral acoustic sensors 2a, 2b, 2c, 2d with non-overlapping peaked frequency response and inclusive of one acoustic sensor 2 with broad frequency response spanning the audible through ultrasonic frequency range. In an exemplary embodiment, the multi-spectral acoustic sensors 2a, 2b, 2c, 2d with peaked frequency response are piezoelectric sensors. In an exemplary embodiment, the acoustic sensor 2 with broad frequency response is a pre-polarized ultrasonic pressure microphone such as one manufactured by G.R.A.S. Sound and Vibration of Holte, Denmark. In another exemplary embodiment, the acoustic sensor 2 with broad frequency response may be a miniature microphone based on MEMS (Micro Electro Mechanical Systems) technology such as one manufactured by Knowles Acoustics of Itasca, Ill. Such a combination of acoustic sensors enables multi-spectral detection via the multitude of non-overlapping peaked frequency response, while additionally providing for an overall measure of the ultrasonic sound pressure level (SPL) computed from the broadband frequency response of the ultrasonic microphone. Audible frequency response will typically be excluded from the SPL calculation, since there are many possible sources of audible nuisance sounds. The measured SPL is an indication of the severity of the gas leak. In an exemplary embodiment, the acoustic sensors of FIG. 3 are placed on the exterior of the ultrasonic gas leak detector to receive acoustic energy from a potential gas leak from the same direction. In an exemplary embodiment, the five acoustic sensors are mounted in close proximity on the planar surface of a mechanical housing pointing in the same direction, and arranged to receive the same acoustic signals from distant gas leak or other acoustic sources. In another embodiment, the five acoustic sensors are mounted in close proximity on a sculpted or curved mechanical housing exterior, again pointing in the same direction, to receive the same acoustic signals from distant gas leak or other acoustic sources. A diameter of 10 cm to 15 cm would be typical to encompass all five sensors. With MEMS type devices, the devices could be closer as the devices are smaller. Preferably, the sensor devices would be placed close or as close as possible within packaging constraints.

Figure 4:
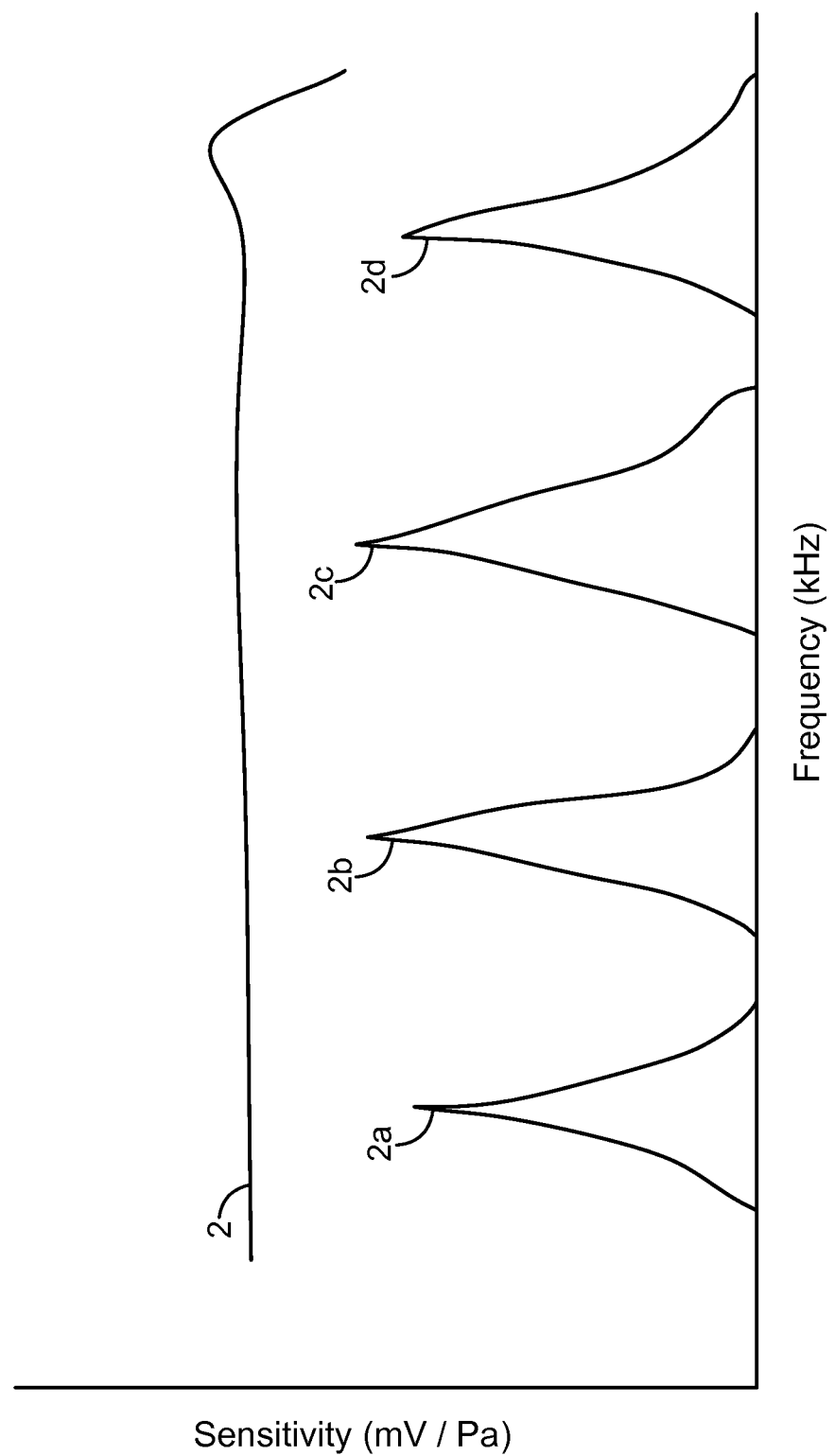
FIG. 4 is a graphical representation of the frequency responses of the multiple acoustic sensors of FIG. 3.

FIG. 4 is an exemplary pictorial of the frequency response of the acoustic sensors of FIG. 3, with one broadband microphone 2 and four multi-spectral resonant piezoelectric sensors 2a, 2b, 2c and 2d. One or more, or all of the frequencies of the four acoustic sensors 2a, 2b, 2c and 2d may be selected to target naturally occurring or manmade acoustic frequencies that are a nuisance for industrial ultrasonic gas leak detection. Measuring the acoustic energy at such frequencies may aid in detection of a gas leak by providing specialized inputs for training of the artificial neural network (ANN), as described more fully with respect to FIGS. 5-8.

In an exemplary embodiment describing the functionality of the embodiments of FIG. 1, FIG. 2 and FIG. 3, each ultrasonic gas leak detection system includes an electronic controller 5, e.g., a digital signal processor (DSP), an ASIC or a microcomputer or microprocessor based system. In an exemplary embodiment, the signal processor 5 may comprise a DSP, although other devices or logic circuits may alternatively be employed for other applications and embodiments. In an exemplary embodiment, the signal processor 5 also comprises a dual universal asynchronous receiver transmitter (UART) 51 as a serial communication interface (SCI), a serial peripheral interface (SPI) 52, an internal ADC 53, an external memory interface (EMIF) 54 for an external memory (SRAM) 21, and a non-volatile memory (NVM) 55 for on-chip data storage. Modbus 91 or HART 92 protocols may serve as interfaces for serial communication over UART 51. Both protocols are well-known in process industries, along with others such as PROFIbus, Fieldbus and CANbus, for interfacing field instrumentation to the user's computer or programmable logic controller (PLC).

In an exemplary embodiment, signal processor 5 receives the digital detector signals 4 from the ADC 3 through the SPI 52. In an exemplary embodiment, the signal processor 5 is connected to a plurality of other interfaces through the SPI 52. These interfaces may include an external NVM 22, a real-time clock 23, an alarm relay 24, a fault relay 25, a display 26, and an analog output 27.

In an exemplary embodiment, the analog output 27 may produce an indicative current level between 0 and 20 milliamps (mA), which can be used to trigger a remedial action, such as, by way of example only, shutting down process equipment pursuant to an established facility protocol. A first current level at the analog output 27, for example between 4 mA and 20 mA, may be indicative of a gas leak, a second current level at the analog output 27, for example 4 mA, may be indicative of normal operation, e.g., when no gas leak is present, and a third current level at the analog output 27, for example, 0 mA, may be indicative of a system fault, which could be caused by conditions such as electrical malfunction. In other embodiments, other current levels may be selected to represent various conditions.

In an exemplary embodiment, the signal processor 5 is programmed to perform signal pre-processing and artificial neural network (ANN) processing, as discussed more fully below.

Figure 5:
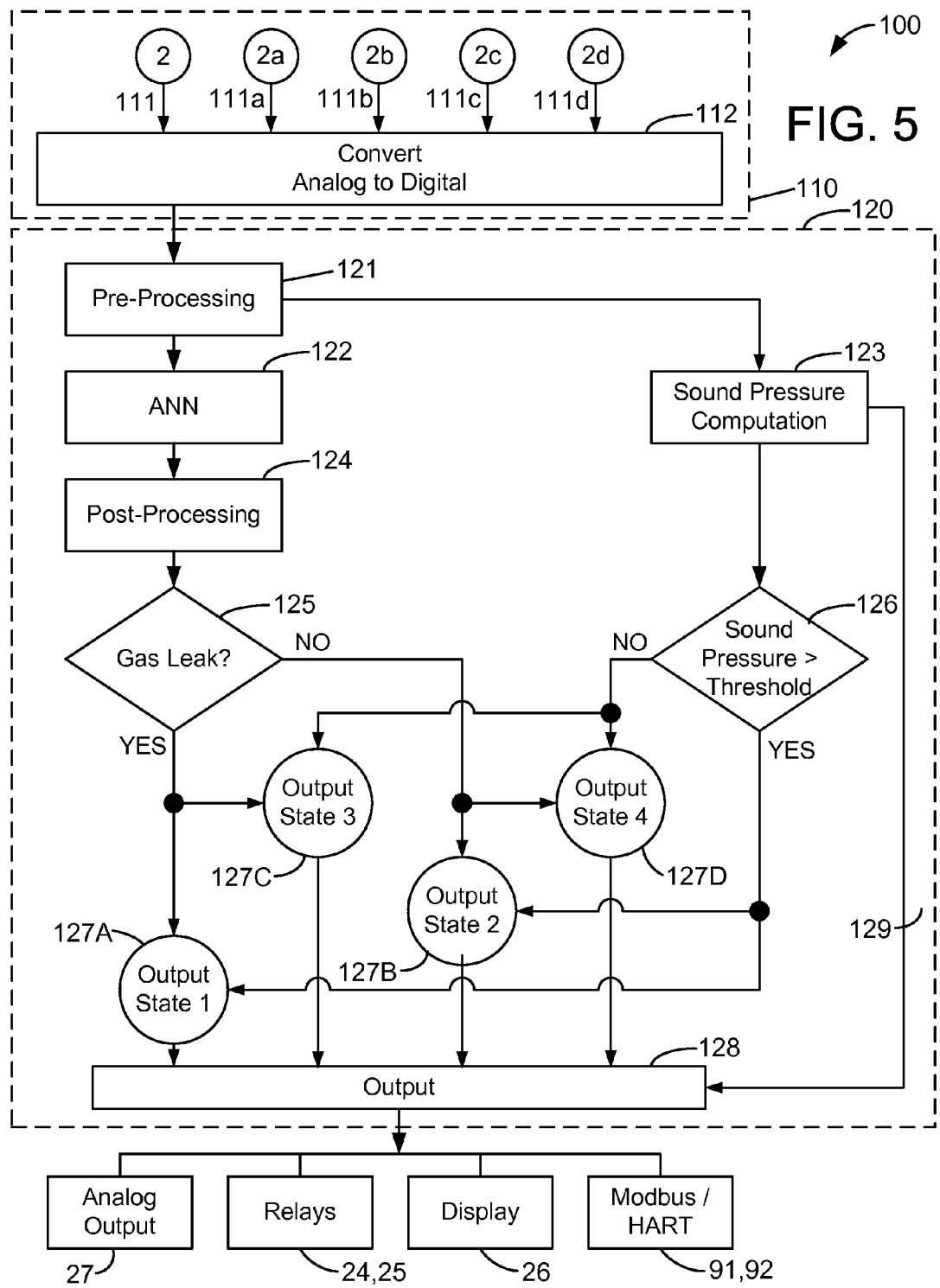
FIG. 5 is a functional block diagram of features of the multi-spectral ultrasonic gas leak detection system of FIG. 3.
Figure 6:
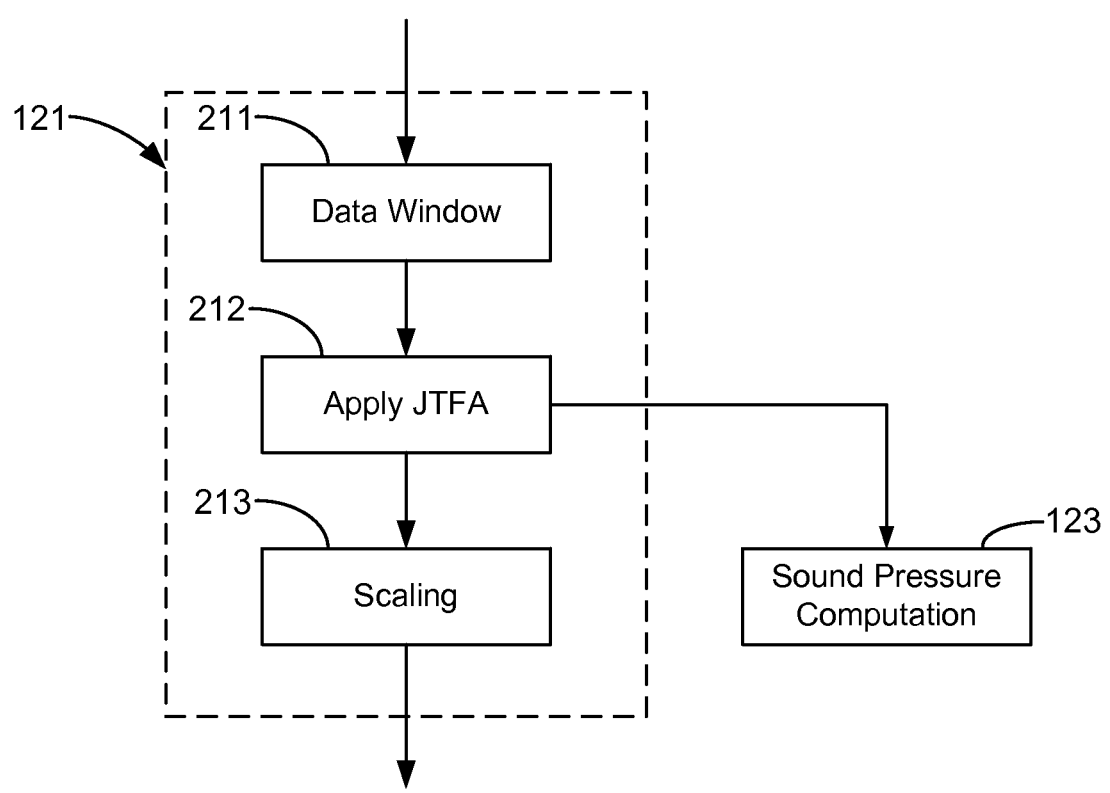
FIG. 6 is an exemplary flow diagram of the pre-processing functions utilized in the ultrasonic gas leak detection system of FIG. 3.

FIG. 5 is an exemplary functional block diagram of an exemplary gas detection system 100. The system includes a sensor data collection function 110, which collects the analog conditioned sensor signals 111, 111a, 111b, 111c, and 111d from the multiple acoustic sensors 2, 2a, 2b, 2c, and 2d respectively, and converts the sensor signals into digital form 112 for processing by the digital signal processor. In an exemplary embodiment, this digital conversion is done for the acoustic sensor signals in a time-multiplexed, serial manner. Processing algorithms 120 are then applied to the sensor data, including signal pre-processing 121, ANN validation function 122, sound pressure computation 123, and post-processing 124 leading to decision block 125. In an exemplary embodiment, the computed sound pressure level (SPL) from broadband microphone sensor 2 is compared against a preset threshold 126, while the post processed ANN provides a determination as to whether the microphone signal is generated by a real gas leak 125. In an exemplary embodiment, the combination of the decision blocks 125 and 126 result in four combinations:

Output state 127A for combination (1) Yes to Gas Leak & (2) Yes to SPL>threshold Output state 127B for combination (1) No to Gas Leak & (2) Yes to SPL>threshold Output state 127C for combination (1) Yes to Gas Leak & (2) No to SPL>threshold Output state 127D for combination (1) No to Gas Leak & (2) No to SPL>threshold Output state 127A corresponds to the case of a real gas leak and one that exceeds the SPL threshold (126). The threshold value (126) may be considered a gas detection threshold; the user may choose to set a higher alarm threshold for alarm relay 24 in the output block 128. Output state 127A also includes the more general case of a real gas leak in the presence of a false alarm (background noise) as the ANN is trained to classify such a situation as a real gas leak. Output state 127B corresponds to the situation where the large measured SPL has been diagnosed as not being caused by a gas leak, but rather from a false alarm source. Output state 127C corresponds to the detection of a real gas leak, but small enough in magnitude to produce an SPL less than the threshold (126). Output state 127C may be considered to be a minor leak, or to provide a warning to the user of an imminent larger leak. The user would typically not take corrective action but is advised to monitor the facility more closely. Output state 127D corresponds to the situation where nothing much is happening; there is no evidence of a gas leak and the background SPL is at a value considered insignificant. Output state 127D would be typical of a quiet industrial environment such as a remote onshore wellhead.

The information from output states 127A, 127B, 127C, and 127D is continuously transmitted via output block 128 to the relays 24 and 25, display 26, analog output 27, and one or more external communication interfaces such as Modbus 91 and HART 92. Output block 128 may be programmed by the user to define what is sent to the various user interfaces, e.g., the display may indicate the SPL regardless of it being caused by a gas leak or a false alarm, or the display may indicate the SPL only when it is determined to be caused by a real gas leak. It is also possible for the user to configure output block 128 to directly show just the SPL measured and transmitted via 129 regardless of the status of the output states 127A, 127B, 127C, and 127D; in this manner the effect of ANN processing and decision making can be bypassed temporarily or permanently, as required. The user may also set an alarm SPL threshold via output block 128 to activate alarm relay 24 that is higher than the minimum gas detection threshold used in decision block 126. The user may also program the output block 128 with a user settable time delay to ensure that an ANN determined gas leak lasts for certain duration before taking corrective action, via, for example, alarm relay 24.

The exemplary embodiments of ultrasonic gas leak detection systems 1, 50 and 60 described in FIG. 2, FIG. 3 and FIG. 5 provide means for distinguishing the ultrasound generated by pressurized gas leaking into the atmosphere from the ultrasound generated by other mechanical, electrical discharge, acoustic or biological sources in the vicinity. The ultrasound from such other sources, classified as false alarms, may produce a large background ultrasound reading with prior art ultrasonic gas leak detectors: this high background results in the setting of elevated alarm levels, typically 6 decibels above the background ultrasound. Raising the alarm level has the drawback of reducing detection distance to the gas leak and thereby the total area of coverage, resulting in an area gas leak monitor behaving more like a point gas leak detector. Additionally, real gas leaks may be ignored until they build up in severity, often with catastrophic consequences. False alarm sources that produce transient or short lived ultrasound are also handled with prior art ultrasonic gas leak detectors via the use of time delays, which result in undesirable delays to the remedial action in case of a dangerous gas leak. A method and system for the reliable discrimination and quantification of gas leaks provide room for lowering the alarm level thereby extending the range of detection and area of coverage, as well as for reducing time delays to remedial action. Such a method and system may enable the ultrasonic gas leak detection system to provide one or more of the following benefits, (1) an area monitor, (2) a response time based on the speed of sound, and (3) an increase in overall process production due to the reduction of nuisance alarms.

In an exemplary embodiment, the analog signals from the acoustic sensors 2, 2a, 2b, 2c, and 2d are periodically converted to digital form by the internal ADC 53. As shown in FIG. 5, pre-processing 121 is performed on the digitized sensor signals. In an exemplary embodiment, an objective of the pre-processing function 121 is to establish a correlation between frequency and time domain of the signal. In an exemplary embodiment shown in FIG. 6, the pre-processing function 121 includes applying 211 a data windowing function and applying 212 a Joint Time-Frequency Analysis (JTFA) function independently to each digitized acoustic sensor signal. In an exemplary embodiment, data windowing function 211 involves applying one of a Hanning, Hamming, Parzen, rectangular, Gauss, exponential or other appropriate data windowing function. In an exemplary embodiment, the data window function 211 comprises a Hamming window function which is described by a cosine type function:

$$W^{Hm} = \frac{1}{2}\left\{1.08 - 0.92\cos\left(\frac{2\pi n}{N-1}\right)\right\}$$

where N is number of sample points (e.g. 512) and n is between 1 and N.

In an exemplary embodiment of the data preprocessing 121, the Hamming window function is applied 211 to a raw input signal before applying 212 a JTFA function. This data windowing function alleviates spectral "leakage" of the signal and thus improves the accuracy of ANN classification.

Referring again to FIG. 6, in an exemplary embodiment, JTFA 212 encompasses a Discrete Fourier Transform. The JTFA may also encompass a Short-Time Fourier Transform (STFT) with a shifting time window (also known as Gabor transform), or a Discrete Wavelet Transform (DWT). The output of the Fourier transform may be filtered or processed to remove frequency responses outside an ultrasonic frequency band, for example, between about 15 kHz or about 20 kHz to about 70 kHz. The JTFA application is followed by a scaling operation 213; this normalizes the data by subtracting the mean and dividing by the standard deviation to effectively scale the inputs to the ANN 122 (FIG. 5). In an exemplary embodiment, coefficients and algorithms used for the windowing function 211, JTFA 212, and the scaling function 213 are stored in non-volatile memory. In an exemplary embodiment, the coefficients may be stored in NVM 55 (FIG. 3).

Referring again to FIG. 5 and FIG. 6, the pre-processed data after application of the windowing function and JTFA operation is also fed into the block 123 for sound pressure computation. The SPL is computed by summing over the magnitude of the intensities at the various ultrasonic frequencies utilized in the Fourier Transform from broadband microphone 2 and normalized by a calibration factor dependent on the microphone sensitivity and electronic gain. Energy from audible frequencies is not summed, as described above; rather the responses for frequencies below 15 kHz (for example) at the JTFA 212 will not be used in the SPL computation. In an exemplary embodiment, the frequency range of the energy may be selected to be within a frequency range of about 15 KHz to about 70 kHz, with energy outside the band not used in the calculation. The ultrasonic SPL is expressed in decibels (dB), which is a logarithmic measure of the effective pressure of sound relative to a reference value. The commonly used "zero" reference sound pressure (0 dB) in air is 20 μPa RMS, historically derived from the threshold of human hearing. The typical values of ultrasonic SPL in a quiet industrial environment such as remote onshore wellheads may be between 40 dB and 58 dB, while the background ultrasonic SPL can be much higher in the presence of machinery in operation such as compressors, generators and coolers (fin-fans).

The computed SPL from computation 123 is compared against a threshold in decision block 126 (FIG. 5). The SPL calibration factor for 123 and SPL threshold value for 126 may be stored in non-volatile memory NVM 55.

Figure 7:
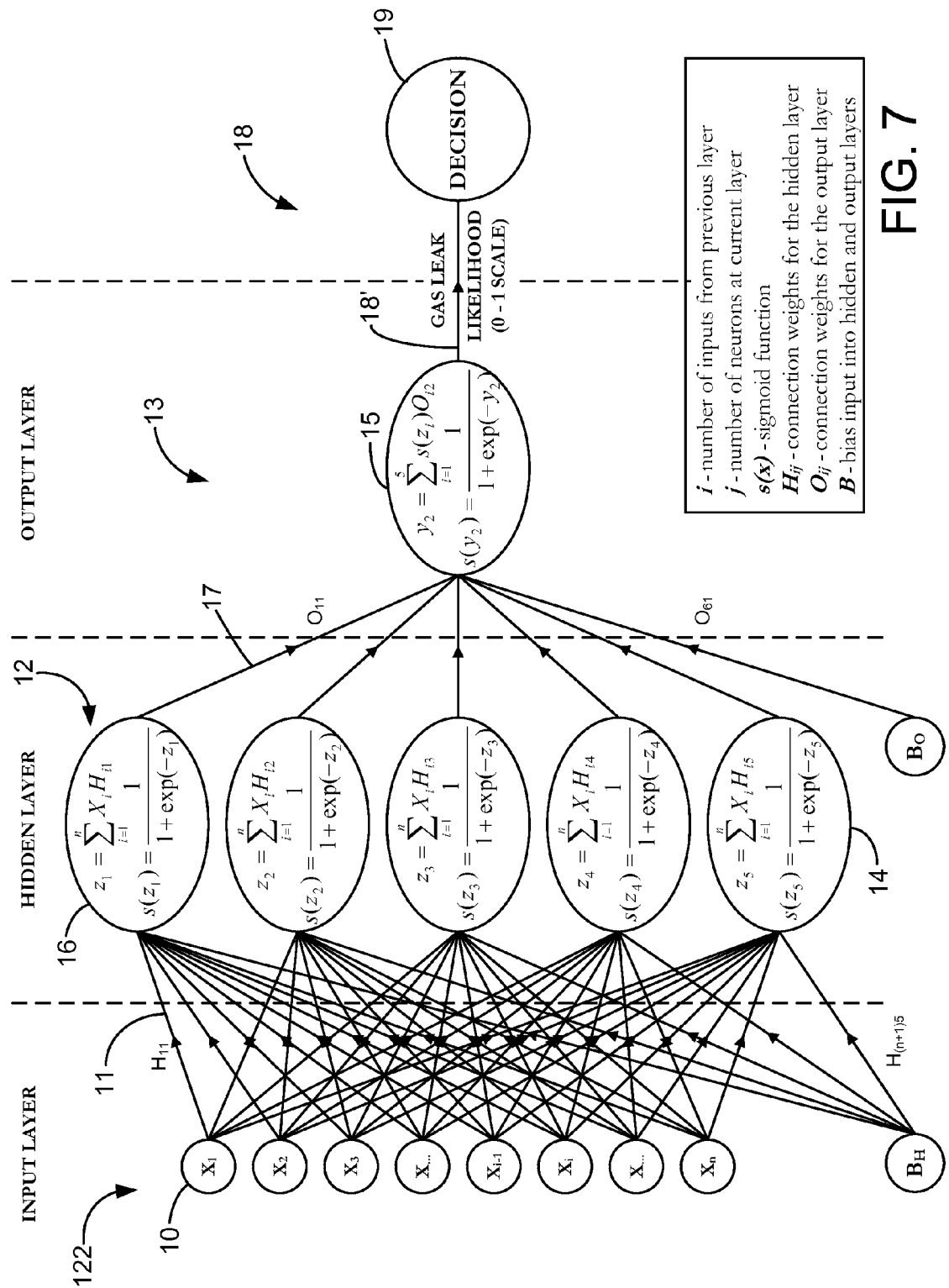
FIG. 7 illustrates an exemplary embodiment of artificial neural network (ANN) processing utilized in the multi-spectral ultrasonic gas leak detection system of FIG. 3.

FIG. 7 illustrates a functional block diagram of an exemplary embodiment of ANN processing 122. ANN processing 122 may comprise two-layer ANN processing. In an exemplary embodiment, ANN processing 122 includes receiving a plurality of pre-processed signals 121 (x1-xi) generated by the acoustic sensors 2, 2a, 2b, 2c, and 2d (corresponding to the data windowed 211, JTFA processed 212, and scaled signals 213 shown in FIG. 6), a hidden layer 12 and an output layer 13. In other exemplary embodiments, ANN processing 122 may comprise a plurality of hidden layers 12. The pre-processed signals 121 (x1-xi) include the respective pre-processed signals from acoustic sensors 2, 2a, 2b, 2c, and 2d in a fixed order 10 in the input layer of ANN processing 122.

In an exemplary embodiment, the hidden layer 12 includes a plurality of artificial neurons 14, for example five neurons as shown in FIG. 7. The number of neurons 14, known as hidden neurons, may depend on the level of training and classification achieved by the ANN processing 122 during training. In an exemplary embodiment, the output layer 13 includes a plurality of targets 15 (or output neurons) corresponding to various conditions. The number of targets 15 may be, for example, from one to four. The exemplary embodiment of FIG. 7 employs one target neuron 15, which outputs event likelihood 18' to decision processing 19.

In an exemplary embodiment, the NVM 55 (FIG. 3) holds synaptic connection weights $H_{ij}$ 11 for the hidden layer 12 and synaptic connection weights $O_{jk}$ 17 for the output layer 13. In an exemplary embodiment, the signal processor 5 sums the plurality of pre-processed signals 10 at neuron 14, each multiplied by the corresponding synaptic connection weight $H_{ij}$ 11. A non-linear activation (or squashing) function 16 is then applied to the resultant weighted sum $z_i$ for each of the plurality of hidden neurons 14. In an exemplary embodiment, shown in FIG. 7, the activation function 16 is a unipolar sigmoid function ($s(z_i)$). In other embodiments, the activation function 16 can be a bipolar activation function or other appropriate function. In an exemplary embodiment, a bias $B_H$ is also an input to the hidden layer 12. In an exemplary embodiment, the bias $B_H$ has the value of one. Referring again to FIG. 7, in an exemplary embodiment, the neuron outputs ($s(z_i)$) are input to the output layer 15. In an exemplary embodiment, a bias $B_O$ is also an input to the output layer 15. In an exemplary embodiment, the outputs ($s(z_i)$) are each multiplied by a corresponding synaptic connection weight $O_{jk}$ 17 and the corresponding results are summed for output target 15 in the output layer 13, resulting in a corresponding sum $y_j$.

Thus, as depicted in FIG. 7, the signal-processed inputs $X_i$ 10 are connected to hidden neurons 14, and the connections between input and hidden layers are assigned weights $H_{ij}$ 11. At every hidden neuron, the multiplication, summation and sigmoid function are applied in the following order.

$$Z_j = \sum_{i=1}^{n} X_i H_{ij}$$

$$S(Z_j) = \frac{1}{1 + \exp(-Z_j)}$$

The outputs of sigmoid function $S(Z_j)$ from the hidden layer 12 are introduced to the output layer 13. The connections between hidden and output layers are assigned weights $O_{jk}$ 17. Now at every output neuron multiplication, in this exemplary embodiment, summation and sigmoid function are applied in the following order:

$$Y_k = \sum_{i=1}^{n} S(Z_j) O_{jk}$$

$$S(Y_k) = \frac{1}{1 + \exp(-Y_k)}$$

In an exemplary process of ANN training, the connection weights $H_{ij}$ and $O_{jk}$ are constantly optimized by Back Propagation (BP). In an exemplary embodiment, the BP algorithm applied is based on mean root square error minimization via the conjugate-gradient (CG) descent method. The algorithm is applied using MATLAB, a tool for numerical computation and data analysis, to optimize the connection weights $H_{ij}$ and $O_{jk}$. These connection weights are then used in ANN validation, to compute the ANN outputs $S(Y_k)$, which are used for final decision making. In an exemplary embodiment, an ANN may be trained by exposing the ultrasonic gas leak detector to a plurality of combinations of ultrasound generated by real gas leaks, false alarm sources comprising mechanical, electrical discharge, acoustic, or biological sources, and combinations of real gas leaks and false alarm sources. During training the output values are compared with the correct answer; the algorithm adjusts the weights of each connection $H_{ij}$ and $O_{jk}$ in order to reduce the value of the error function at each iteration. After repeating this process for a sufficiently large number of training cycles, the network usually converges to a state where the error is small. Multi-layered ANNs and ANN training using the BP algorithm to set synaptic connection weights are described, e.g. in Rumelhart, D. E., Hinton, G. E. & Williams, R. J., Learning Representations by Back-Propagating Errors, (1986) Nature, 323, 533-536. It is shown that a multilayer network, containing one or two layers of hidden nodes, is required to handle non-linear decision boundaries.

In an exemplary embodiment, the training for the ANN employs a set of robust indoor, outdoor, and industrial site tests. Data collected from these tests is used for ANN training performed on a personal or workstation computer equipped with MATLAB or a similar numerical computing program. The data can be collected using the hardware shown in FIG. 3, suitably mounted on a portable platform. Alternately, a commercially available ultrasonic microphone and recorder, such as the Model D1000X ultrasound detector from Pettersson Electronik, Uppsala, Sweden, can be used for data collection. False alarm sources used for both indoor and outdoor collection include ultrasonic dog whistles that use piezoelectric transducers to generate high intensity, single frequency ultrasound; mechanical sources of ultrasound include metal grinders and sand blasters; electrical discharge sources of ultrasound include welding and corona discharge. Field data collected from industrial sites may include noise generated by compressors, generators, choke valves, separators, and coolers (fin-fans), including data from nuisance sources emitting strongly in the bandwidth of one or more of the peaked acoustic sensors 2a, 2b, 2c or 2d. Data collected from real gas leaks may include a plurality of gas types, pressures, orifice sizes and flow rates. Gases under consideration could include those of low molecular weight such as hydrogen and methane, as well as those of higher molecular weight such as carbon dioxide, ethylene and propane. It should be noted that many of the gases with higher molecular weight are in liquid state when under pressure; the ultrasound is generated when they became gaseous upon release to the atmosphere. Technical details of the experimental setup to generate such gas leaks are described, e.g. in Naranjo, E., Baliga, S., Neethling, G. A., & Plummer, C. D., Safe Detection of Small to Large Gas Releases, (January 2011) Hydrocarbon Processing, 57-60.

In an exemplary embodiment, the training data may include over one hundred such files of ultrasound produced by a plurality of false alarm sources, real gas leaks and combinations of real gas leaks and false alarm sources. The connection weights $H_{ij}$ and $O_{jk}$ derived from such comprehensive ANN training can be loaded into the software of prototype ultrasonic gas leak detectors for further validation by rigorous laboratory and field testing for false alarm rejection and consistent gas leak detection (via decision block 125, FIG. 5), and accurate SPL computation (via 123, FIG. 5). Subsequent to the successful validation, the connection weights $H_{ij}$ and $O_{jk}$ may be programmed into manufactured units.

In an exemplary embodiment illustrated in FIG. 7, the ANN processing 122 outputs value 18' that represent a percentage likelihood of a gas leak detected via ultrasonic gas leak detection. A threshold applied to the output, sets the limit of the likelihood, above which a gas leak condition is indicated. In an exemplary embodiment, neuron output 18' value above 0.9 (on a scale of 0 to 1) indicates a strong likelihood of gas leak, whereas a smaller output indicates a strong likelihood of false alarm conditions. This analysis is conducted in ANN decision block 19.

Referring back to FIG. 5, post-processing 124 takes the output of the ANN 122 via the ANN decision block 19 (FIG. 7) and performs a final post-processing that may include other criteria such as factory or user defined criteria. Post-processing 124 may include post-processing such as counting the number of times the neuron output 18' exceeds a threshold value as defined by the ANN decision block 19. For example, it may be desirable to have the neuron output 18' exceed a threshold four times within a given time period, for example one second, before the gas leak condition is output. This limits the likelihood of an isolated spurious input condition or transient to be interpreted as a gas leak condition thus causing a false alarm. In an exemplary embodiment, the threshold value may be set at 0.8 on a scale of 0 to 1.

Referring to FIG. 5, the output of the post-processing 124 is processed by decision block 125. In an exemplary embodiment, if ANN decision block 125 determines that a gas leak has occurred this decision is tied in with the output of threshold decision block 126 that compares the computed SPL versus a preset gas detection threshold. As described earlier, four output state combinations 127A, 127B, 127C, and 127D are possible for this exemplary embodiment. The outputs of these output states 127A, 127B, 127C, and 127D are continuously transmitted via output block 128 to the relays 24 and 25, display 26, analog output 27, and external communication interfaces such as Modbus 91 and HART 92. Output block 128 may be programmed by the user to define what is sent to the various user interfaces, e.g., the display may indicate the SPL regardless of whether it is caused by a gas leak or false alarm, or the display may indicate the SPL only when it is determined to be caused by a real gas leak. The user may also set an alarm SPL threshold via output block 128 to activate alarm relay 24 that is higher than the minimum gas threshold set for decision block 126. The user may also program the output block 128 with a user settable time delay to ensure that an ANN determined gas leak lasts for certain duration before taking corrective action via, for example, alarm relay 24.

Figure 8:
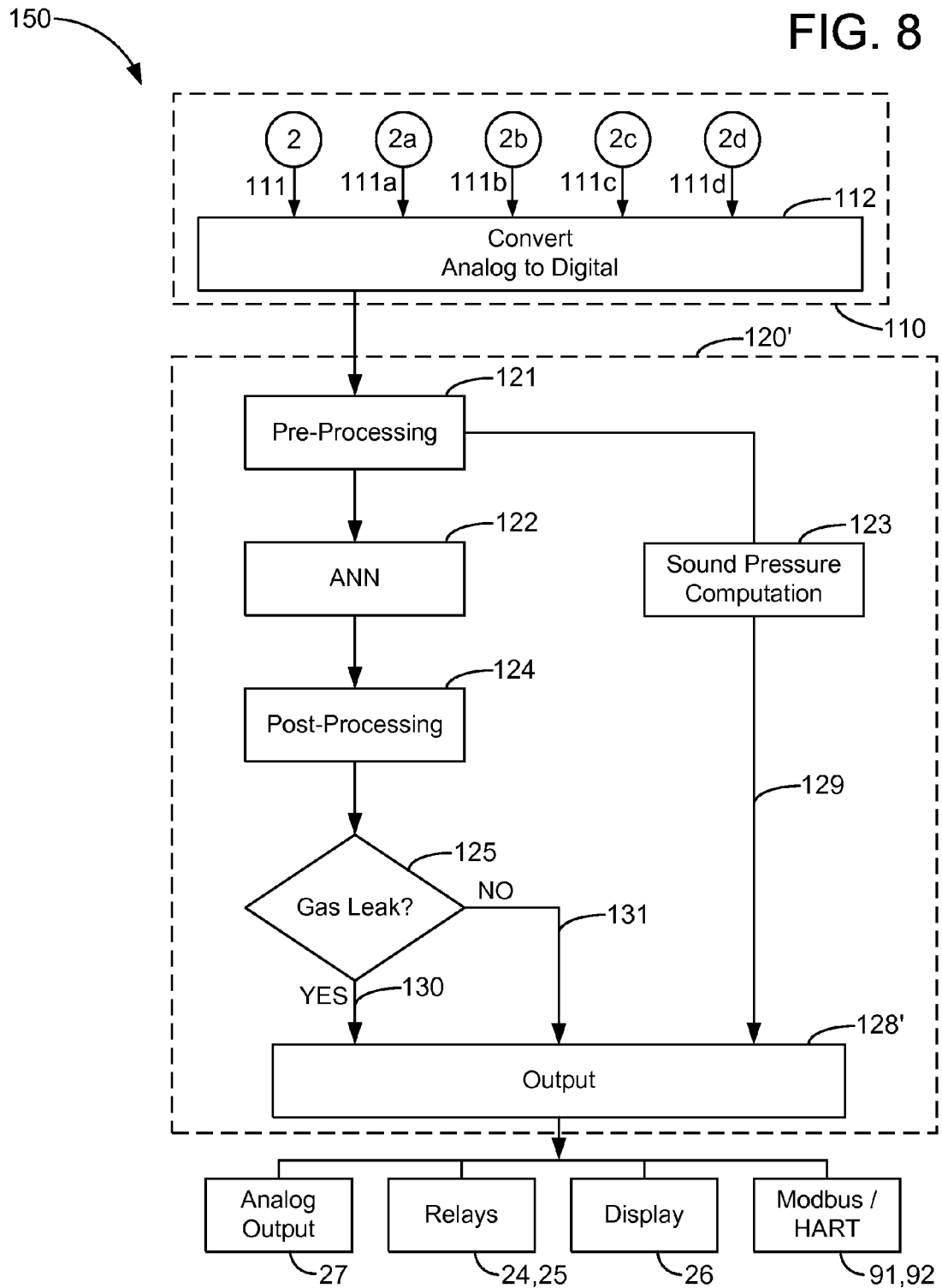
FIG. 8 is a functional block diagram of another exemplary embodiment of a multi-spectral ultrasonic gas leak detection system.

Referring now to FIG. 8, features of another exemplary embodiment of an ultrasonic gas leak detector are depicted, depicting a functional block diagram 150 of the gas leak detector. This embodiment is similar to that described above regarding FIGS. 3-7. However, in this exemplary embodiment, the signal processor 5 is programmed to implement processing algorithms 120', in which the computed SPL from sound pressure computation 123 is not compared against a preset threshold as shown in block 126 of FIG. 5. Rather, the computed SPL 129 is sent directly to the output block 128'. At the same time, the post processed ANN provides a determination via decision block 125 as to whether the microphone signal is generated by a real gas leak indicated by output state 130 or by a false alarm as shown by output state 131, both in FIG. 8. The output block 128' then informs the user of the presence (from output state 130) and severity (in dB) (from signal 129) of a real gas leak via the output functions of the alarm relay 24, display 26, analog output 27, and external communication interfaces such as Modbus 91 and HART 92. If the computed SPL is shown to be created by a false alarm via output state 131 from decision block 125, the output block 128' can similarly inform the user of the false alarm event and its severity (in dB) via display 26, analog output 27, and external communication interfaces such as Modbus 91 and HART 92; in the case of a false alarm event indicated by output state 131 the alarm relay 24 would, however, not be activated.

The exemplary embodiments described in FIG. 3 through FIG. 8 include four specialized acoustic sensors with non-overlapping peaked frequency response, and one broadband microphone. However, the number of specialized acoustic sensors and their peak frequencies are exemplary, and may be changed within the scope of this invention, with at least one broadband acoustic sensor and one peaked or narrowband response acoustic sensor.

Although the foregoing has been a description and illustration of specific embodiments of the invention, various modifications and changes thereto can be made by persons skilled in the art without departing from the scope and spirit of the invention.

What is claimed is:

1. An ultrasonic gas leak detector configured to discriminate the ultrasound generated by a pressurized gas leak into the atmosphere from false alarm ultrasound generated by other mechanical, electrical, acoustic or biological sources in the vicinity, comprising:
    a sensor system for detecting atmospheric ultrasonic energy and providing sensor signals, said sensor system including a broadband sensor and at least one narrowband sensor, each of the broadband sensor and the at least one narrowband sensor configured for detecting atmospheric energy;
    an electronic controller responsive to digital sensor signals representative of the sensor signals, the electronic controller comprising:
    a threshold comparator to compare a sensor signal value representative of sensed ultrasonic energy to a gas detection threshold value to determine whether the sensor signal value exceeds the gas detection threshold value to provide a threshold comparator output indicating whether a gas leak may have been detected;
    an Artificial Neural Network (ANN) for processing signals derived from the digital sensor signals and applying ANN coefficients configured to discriminate false alarm sources from gas leaks, and providing an ANN output indicating a decision whether a gas leak has been detected;
    an output decision generator for generating detector outputs based on the threshold comparator output and the ANN output.

2. The system of claim 1, wherein the broadband sensor is one of a MEMS microphone and a fiber optical microphone.

3. The system of claim 1, wherein the narrowband sensor is a piezoelectric microphone.

4. The system of claim 1, wherein the sensor signal value representative of sensed ultrasonic energy is a computed sound pressure value.

5. The system of claim 4, wherein the output decision generator provides at least four output states, wherein:
    a first output state results from a combination that the ANN output signal indicates that a gas leak has been detected, and that the threshold comparator output signal indicates that a gas leak may have been detected;
    a second output state results from a combination that the ANN output signal indicates that a gas leak has not been detected, and that the threshold comparator output signal indicates that a gas leak may have been detected;
    a third output state results from the combination that the ANN output signal indicates that a gas leak has been detected, and that the threshold comparator output signal indicates that a gas leak has not been detected: and
    a fourth output state results from the combination that the ANN output signal indicates that a gas leak has not been detected, and that the threshold comparator output signal indicates that a gas leak has not been detected.

6. The system of claim 5, wherein the second output state corresponds to the detection state in which where the sound pressure value is diagnosed as not being caused by a real gas leak.

7. The system of claim 5, wherein the third output state corresponds to the detection of a real gas leak that is small enough in magnitude to produce a sound pressure value less than the gas detection threshold value.

8. The system of claim 7, wherein the third output state corresponds to a detection of a minor leak.

9. The system of claim 1, wherein the at least one narrowband sensor comprises a plurality of narrowband sensors with non-overlapping peaked frequency responses within an audible through ultrasonic frequency range.

10. The system of claim 9, wherein the frequency band of at least one of the plurality of narrowband sensors corresponds to frequencies generated by a nuisance acoustic source.

11. The system of claim 9, wherein the plurality of narrowband sensors comprise four sensors having respective peaked frequency responses at 10 kHz, 25 kHz, 40 kHz and 55 kHz, and a bandwidth of about 3 kHz.

12. An ultrasonic gas leak detector configured to discriminate the ultrasound generated by a pressurized gas leak into the atmosphere from false alarm ultrasound, comprising:
    a sensor system for detecting ultrasonic energy and providing sensor signals, the sensor system including a broadband sensor and a plurality of narrowband sensors having respective non-overlapping frequency responses, the broadband sensor and the plurality of narrowband sensors in close physical proximity and configured to receive acoustic signals from a distant gas leak and other acoustic sources;
    an electronic controller responsive to respective digital sensor signals each representative of corresponding respective sensor signals from the broadband sensor and the plurality of narrowband sensors, the electronic controller configured to provide:
    a preprocessing function including an algorithm configured for joint time frequency signal preprocessing the digital sensor signals to provide preprocessed signals corresponding to an ultrasonic frequency band;
    a sound pressure calculation function responsive to the preprocessed signals to provide computed sound pressure values representative of ultrasonic sound pressures sensed by the sensor;
    a threshold comparator function to compare the computed sound pressure values to a gas detection threshold value to determine whether the computed sound pressure values exceed the gas detection threshold value and provide a threshold comparator output indicating whether the gas detection threshold value has been exceeded;
    an Artificial Neural Network (ANN) function for processing the preprocessed signals and applying ANN coefficients configured to discriminate false alarm sources from gas leaks, and providing ANN outputs indicating an ANN decision whether a gas leak has been detected; an output function for generating detector outputs based on the threshold comparator outputs and the ANN output.

13. The system of claim 12, wherein said algorithm is adapted to perform one of a Discrete Fourier Transform, a Short Time Fourier Transform with a shifting time window or a Discrete Wavelet Transform.

14. The system of claim 12, wherein the broadband sensor is an ultrasonic microphone, and the plurality of narrowband sensors comprise piezoelectric acoustic sensors.

15. The system of claim 12, wherein the detector outputs provide at least four output states, wherein:
    a first output state results from a combination that the ANN output signal indicates that a gas leak has been detected, and that the threshold comparator output signal indicates that a gas leak may have been detected;
    a second output state results from a combination that the ANN output signal indicates that a gas leak has not been detected, and that the threshold comparator output signal indicates that a gas leak may have been detected;
    a third output state results from the combination that the ANN output signal indicates that a gas leak has been detected, and that the threshold comparator output signal indicates that a gas leak has not been detected: and
    a fourth output state results from the combination that the ANN output signal indicates that a gas leak has not been detected, and that the threshold comparator output signal indicates that a gas leak has not been detected.

16. The system of claim 15, further comprising an alarm relay, and wherein the detector output generated by the electronic controller is configured to activate the alarm relay in the event of the first output state.

17. The system of claim 12, wherein the ANN function includes applying predetermined trained connection weights stored in memory of the electronic controller, the weights being a result of exposure to a plurality of combinations of ultrasound generated by real gas leaks, false alarm sources comprising mechanical, electrical, acoustic or biological sources, and combinations of real gas leaks and false alarm sources.

18. The system of claim 12, wherein the frequency band of at least one of the plurality of narrowband sensors corresponds to frequencies generated by a nuisance acoustic source.

19. An ultrasonic gas leak detector configured to discriminate the ultrasound generated by a pressurized gas leak into the atmosphere from false alarm ultrasound, comprising:
    a sensor system for detecting ultrasonic atmospheric energy and providing sensor signals, said system comprising a broadband sensor responsive to a broad band of ultrasonic frequencies, and at least one narrowband sensor having a peak frequency response within the broad band, each of the broadband sensor and the at least one narrowband sensor configured for detecting atmospheric energy;
    an electronic controller responsive to respective digital sensor signals representative of each of the sensor signals from the broadband sensor and the at least one narrowband sensor, the electronic controller configured to provide:
    a computation function for generating sensor signal values representative of sensed ultrasonic energy;
    an Artificial Neural Network (ANN) function for processing signals derived from the digital sensor signals and applying ANN coefficients configured to discriminate false alarm sources from gas leaks, and providing ANN outputs indicating a decision whether a gas leak has been detected, the ANN outputs including at least two output states, wherein a first ANN output state indicates that a gas leak has been detected, and a second ANN output state indicates that a gas leak has not been detected;
    a system output function for generating detector outputs indicative of the ANN outputs and the sensor signal values.

20. The system of claim 19, wherein the at least one narrowband sensor comprises a plurality of narrowband sensors with non-overlapping peaked frequency responses within the ultrasonic frequency range.

\* \* \* \* \*